(12) United States Patent
Kadowaki

(10) Patent No.: US 10,846,168 B1
(45) Date of Patent: Nov. 24, 2020

(54) MEMORY WITH ERROR CORRECTION CIRCUIT

(71) Applicant: Winbond Electronics Corp., Taichung (TW)

(72) Inventor: Takuya Kadowaki, Kanagawa (JP)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 16/420,200

(22) Filed: May 23, 2019

(51) Int. Cl.
*G06F 11/10* (2006.01)

(52) U.S. Cl.
CPC ...... *G06F 11/1044* (2013.01); *G06F 11/1016* (2013.01); *G06F 11/1028* (2013.01)

(58) Field of Classification Search
None
See application file for complete search history.

(56) References Cited

U.S. PATENT DOCUMENTS

| | | | | |
|---|---|---|---|---|
| 4,677,589 A * | 6/1987 | Haskell | ................. | G11C 11/405 365/149 |
| 5,127,014 A * | 6/1992 | Raynham | ............ | G06F 11/1076 365/200 |
| 5,740,108 A * | 4/1998 | Okubo | ..................... | G11C 8/10 365/104 |
| 6,144,601 A * | 11/2000 | Takeda | ................... | G11C 7/062 365/203 |
| 6,510,537 B1 * | 1/2003 | Lee | ..................... | G06F 11/1008 714/758 |
| 10,565,055 B2 * | 2/2020 | Chun | .................. | G06F 11/1068 |
| 2008/0016392 A1 * | 1/2008 | Earl | ..................... | G06F 11/1048 714/6.12 |

(Continued)

FOREIGN PATENT DOCUMENTS

| | | |
|---|---|---|
| CN | 106021035 | 10/2016 |
| KR | 20000013395 | 3/2000 |

(Continued)

OTHER PUBLICATIONS

"Office Action of Korea Counterpart Application" with (partial) English translation thereof, dated Feb. 10, 2020, p. 1-p. 9.

(Continued)

*Primary Examiner* — April Y Blair
*Assistant Examiner* — Matthew W Wahlin
(74) *Attorney, Agent, or Firm* — JCIPRNET

(57) ABSTRACT

Memory with an error correction circuit includes: a first error correction circuit performing error correction on first partial data to generate first partial write data or first partial read data; and a second error correction circuit performing error correction on second partial data to generate second partial write data or second partial read data. In a write mode, a plurality of sensing drive circuits respectively receive a plurality of first partial write bits of the first partial write data and a plurality of second partial write bits of the second partial write data, and each sensing drive circuit combines the first partial write bits with the corresponding second partial write bits and writes them to corresponding memory cell columns; in a read mode, the sensing driving circuits respectively sense stored data in the memory cell columns to generate a plurality of first partial read data and second partial read data.

10 Claims, 3 Drawing Sheets

(56) References Cited

U.S. PATENT DOCUMENTS

2008/0175037 A1* 7/2008 Cheng .................... G11C 7/065
365/149

FOREIGN PATENT DOCUMENTS

| KR | 20180073129 | 7/2018 |
|---|---|---|
| TW | 201727661 | 8/2017 |

OTHER PUBLICATIONS

Tae-Young Oh et al., "A 3.2 Gbps/pin 8 Gbit 1.0 V LPDDR4 SDRAM With Integrated ECC Engine for Sub-1 V DRAM Core Operation," IEEE Journal of Solid-State Circuits, vol. 50, Issue: 1, Jan. 2015, pp. 178-190.

Dean Gans, "ECC Brings Reliability and Power Efficiency to Mobile Devices," Feb. 2015, Available at: https://www.micron.com/~/ . . . /ecc_for_mobile_devices_white_paper.pdf.

* cited by examiner

MEMORY WITH ERROR CORRECTION CIRCUIT

BACKGROUND

Technical Field

The disclosure relates to a memory circuit, and more particularly to a memory with an error correction circuit.

Description of Related Art

An error correction code (ECC) circuit is integrated on a dynamic random access memory (DRAM) chip. Since error correction code circuits capable of correcting 2-bit errors require larger circuit area and longer error correction time, error correction code circuits capable of correcting single-bit errors are generally used.

With reference to FIG. 1, a memory 100 includes a first error correction circuit ECC1, a second error correction circuit ECC2, a plurality of memory cell columns MCC and a plurality of sensing drive circuits SD, wherein the first error correction circuit ECC1 and the second error correction circuit ECC2 are both capable of correcting single-bit errors. Each of the memory cell columns MCC includes a plurality of memory cell blocks MC connected to each other in series and each of the memory cell blocks MC further includes a plurality of memory cells (not shown). The plurality of sensing drive circuits SD are respectively coupled to the plurality of memory cell columns MCC and each of the sensing drive circuits SD is coupled to the first error correction circuit ECC1 or the second error correction circuit ECC2. In FIG. 1, for example, the sensing drive circuits SD on the left side of the memory 100 are coupled to the first error correction circuit ECC1 and the sensing drive circuits SD on the right side of the memory 100 are coupled to the second error correction circuit ECC2.

When adjacent memory cells fail at the same time and the failed adjacent memory cells are coupled to the same error correction circuit, the error correction circuit (the first error correction circuit ECC1, for example) may fail to accurately correct a multiple-bit error. To avoid the above issue, in the related art, those skilled in the art often use a spare memory with an error correction circuit, thus resulting in an increase in circuit area and manufacturing cost.

SUMMARY

For the above issue, the disclosure proposes a memory with an error correction circuit to respond to a situation in which a 2-bit error occurs due to failure of adjacent memory cells.

The disclosure provides a memory with an error correction circuit, the memory including a first error correction circuit, a second error correction circuit, a plurality of memory cell columns and a plurality of sensing drive circuits. The first error correction circuit performs error correction on first partial data to generate first partial write data or first partial read data. The second error correction circuit performs error correction on second partial data to generate second partial write data or second partial read data. The plurality of sensing drive circuits are respectively coupled to the plurality of memory cell columns and are coupled to the first error correction circuit and the second error correction circuit. In a write mode, the plurality of sensing drive circuits respectively receive a plurality of first partial write bits of the first partial write data and respectively receive a plurality of second partial write bits of the second partial write data. Each of the sensing drive circuits combines the first partial write bits with the corresponding second partial write bits and writes them to corresponding memory cell columns. In a read mode, the plurality of sensing drive circuits respectively sense stored data in the plurality of memory cell columns to generate a plurality of the first partial read data and the second partial read data.

Based on the above, two adjacent memory cells are respectively coupled to the first error correction circuit and the second error correction circuit. When the two adjacent memory cells fail and cause a read error, from the viewpoint of the first error correction cell, only one read error exists. Similarly, from the viewpoint of the second error correction cell, only one read error exists. As a result, the first error correction circuit and the second error correction circuit can respond to and correct single-bit errors.

In order to make the above features and advantages of the disclosure comprehensible, embodiments accompanied with drawings are described in details below.

DESCRIPTION OF THE EMBODIMENTS

Figure 1:
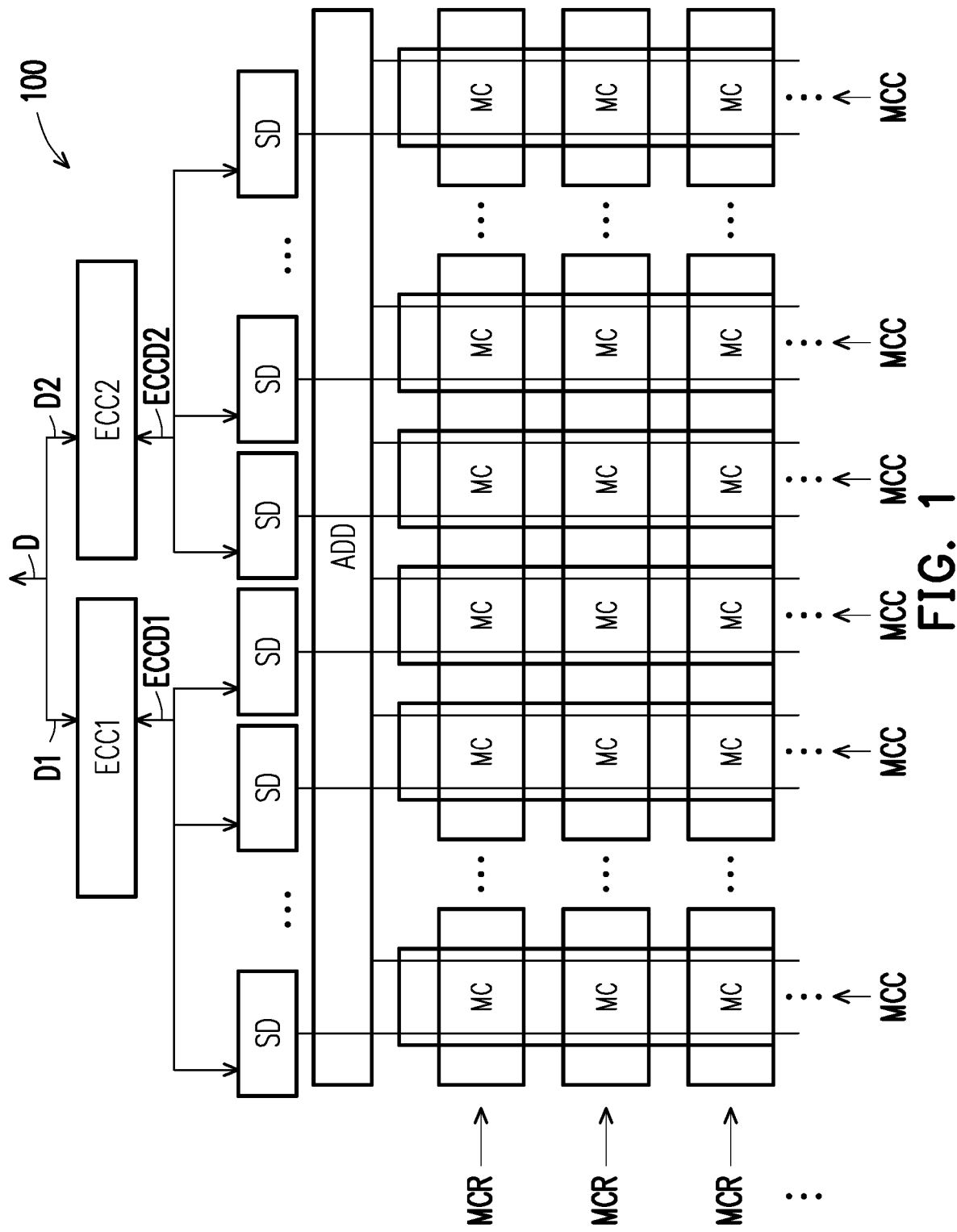
FIG. 1 is a conventional memory with an error correction circuit.
Figure 2:
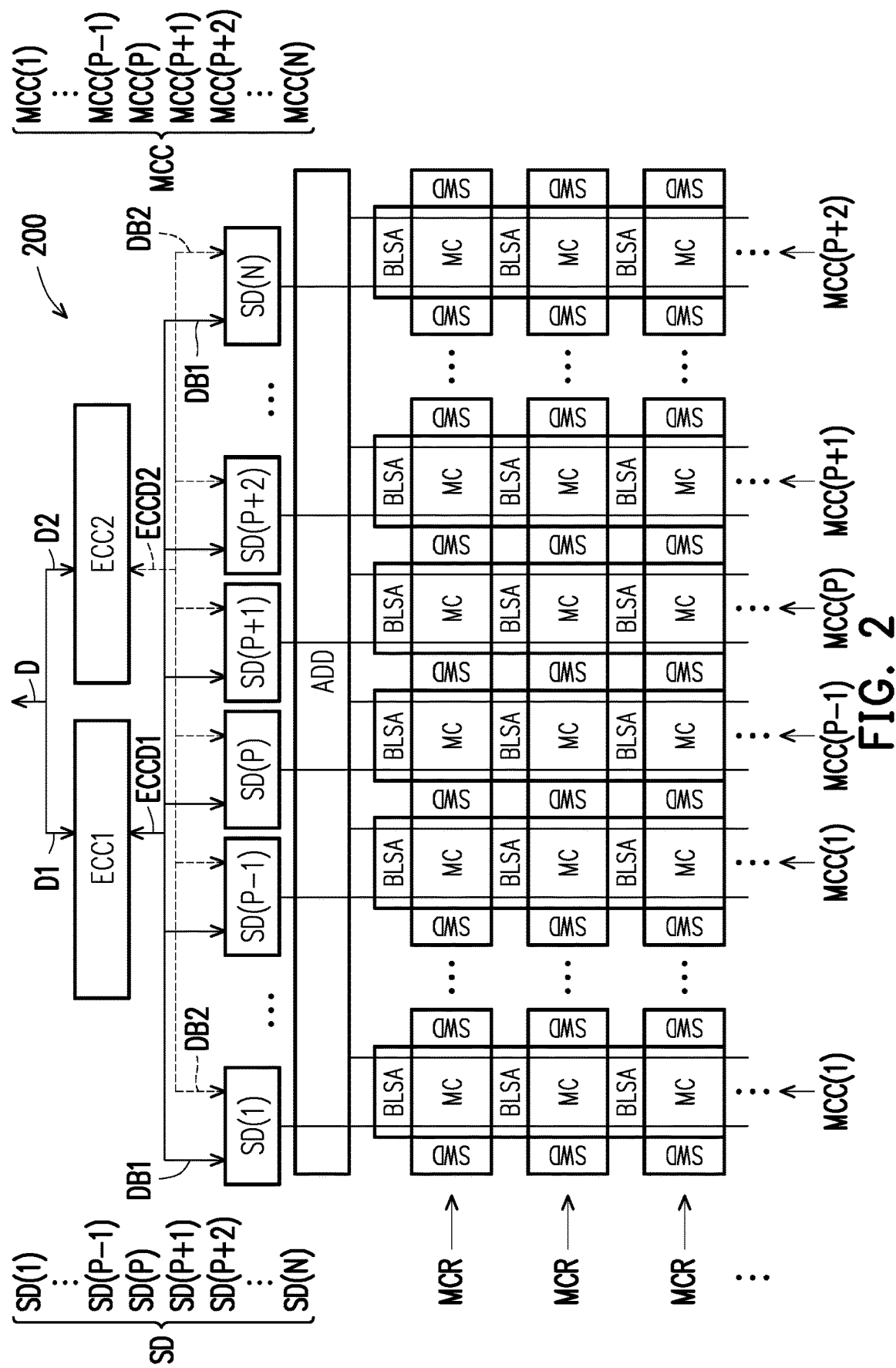
FIG. 2 illustrates a memory with an error correction circuit according to an embodiment of the disclosure.
Figure 3:
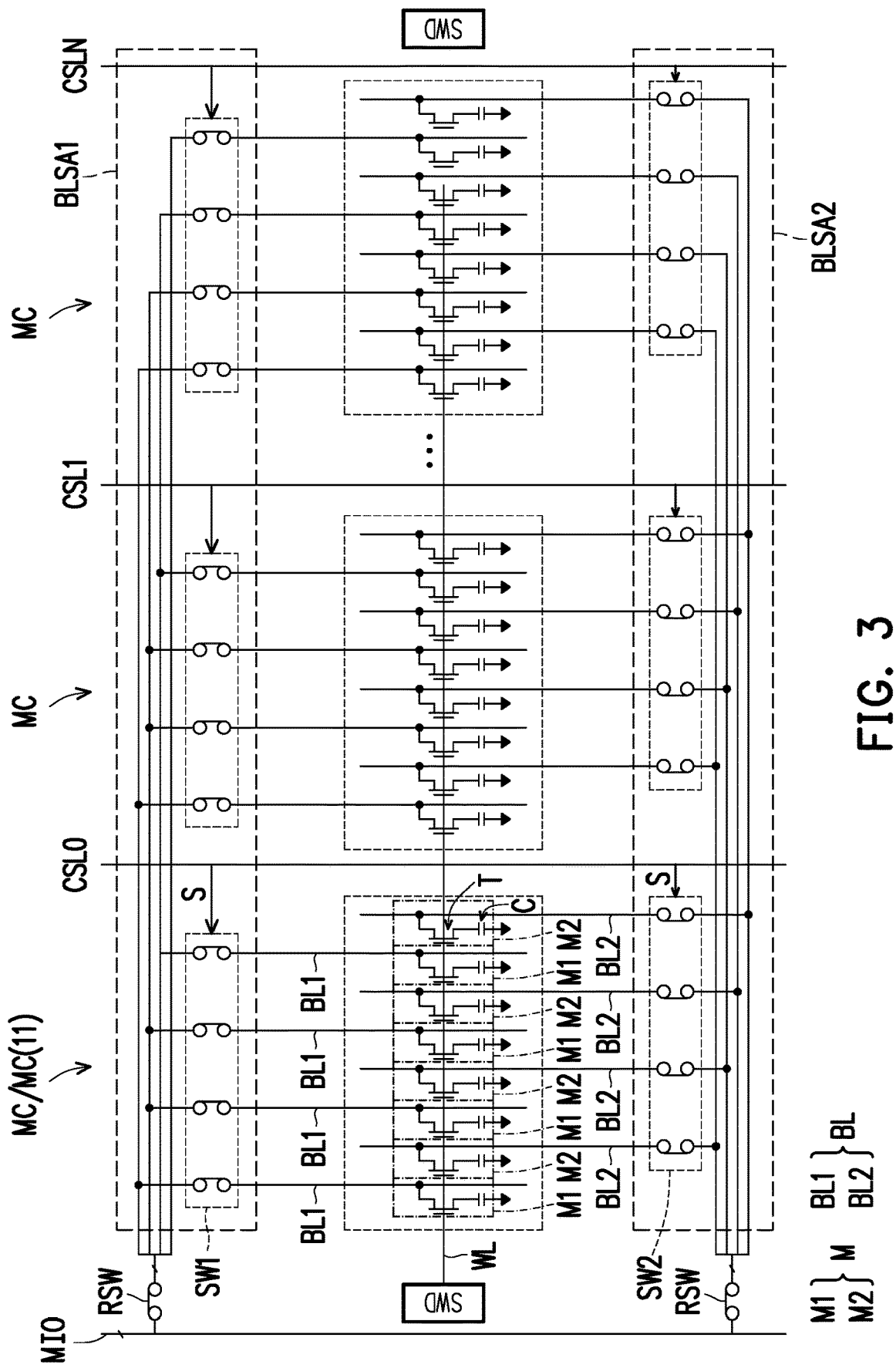
FIG. 3 is a schematic diagram of a memory cell block in a first row of each memory cell column.

With reference to FIG. 2, a memory 200 includes a first error correction circuit ECC1, a second error correction circuit ECC2, a plurality of sensing drive circuits SD, an address decoder ADD and a memory cell array, wherein the memory cell array includes a plurality of memory cell columns MCC and a plurality of memory cell rows MCR, and each of the memory cell columns MCC includes a plurality of memory cell blocks MC connected in series and each of the memory cell blocks MC includes a plurality of memory cells M (as shown in FIG. 3). The plurality of memory cell columns MCC are respectively coupled to the plurality of sensing drive circuits SD through the address decoder ADD, and each of the sensing drive circuits SD is coupled to the first error correction circuit ECC1 and the second error correction circuit ECC2 at the same time, wherein the first error correction circuit ECC1 and the second error correction circuit ECC2 can perform error correction on a single-bit error. The address decoder ADD may include a column decoder (not shown) and a row decoder (not shown).

The memory 200 may allow data D of specific size to be read therefrom or written thereto. In a write mode of the memory, the data D is split into first partial data D1 and second partial data D2. The first error correction circuit ECC1 generates first partial write data ECCD1 including a first error correction code according to the first partial data D1; similarly, the second error correction circuit ECC2 generates second partial write data ECCD2 including a second error correction code according to the second partial data D2. In the present embodiment, the data D may be of, for example, 256 bits, and the first partial data D1 and the second partial data D2 are of 128 bits. The first partial write data ECCD1 and the second partial write data ECCD2 are of 136 bits, wherein the first error correction code of 8 bits and the second error correction code of 8 bits are included.

Next, the first partial write data ECCD1 may be split into a plurality of first partial write bits DB1 (having a size of, for example, 4 bits) and the second partial write data ECCD2 may be split into a plurality of second partial write bits DB2. Each of the sensing drive circuits SD receives the first partial write bit DB1 and the second partial write bit DB2 at the same time, combines the first partial write bit DB1 with the second partial write bit DB2, designates an address by the address decoder ADD, and then writes the combined first partial write bit DB1 and second partial write bit DB2 to the designated address of the corresponding memory cell column MCC.

Take a sensing drive circuit SD1 as an example, the sensing drive circuit SD1 receives the first partial write bit DB1 and the second partial write bit DB2, combines the first partial write bit DB1 and the second partial write bit DB2 and writes them to the designated address of a corresponding memory cell column MCC(1). This address is designated by the address decoder ADD, and is, for example, the memory cell block MC in a first row of a memory cell column MCC(1) shown in FIG. 3.

Still with reference to FIG. 2, in the present embodiment, the first error correction code (of 8 bits, for example) generated by the first error correction circuit ECC1 and included in the first partial write data ECCD1 is also split into two first partial write bits DB1 (of 4 bits, for example) which are received respectively by a sensing drive circuit SD(P) and a sensing drive circuit SD(P+1). Similarly, the second error correction code (of 8 bits, for example) generated by the second error correction circuit ECC2 and included in the second partial write data ECCD2 is split into two second partial write bits DB2 (of 4 bits, for example) which are received respectively by the sensing drive circuit SD(P) and the sensing drive circuit SD(P+1). That is to say, the sensing drive circuit SD(P) (referred to as first error correction code memory cell column) receives a portion of the first error correction code and a portion of the second error correction code respectively and so does the sensing drive circuit SD(P+1) (referred to as second error correction code memory cell column). Then, similarly, the sensing drive circuit SD(P) combines the portion of the first error correction code with the portion of the second error correction code and writes them to a designated address in a corresponding memory cell column MCC(P), and so does the sensing drive circuit SD(P+1).

In the present embodiment, the plurality of memory cell columns MCC include a total of N columns, wherein the first error correction code memory cell column and the second error correction code memory cell column are respectively located in a P-th column and a (P+1)-th column and are disposed adjacent to each other (as shown in FIG. 2), wherein P and N are both natural numbers and 1<P<N. In another embodiment, the first error correction code memory cell column and the second error correction code memory cell column are located at center positions in the plurality of memory cell columns MCC. For convenience of description, in the drawing, the memory cell columns on the left side of the first error correction code memory cell column are referred to as first data code memory cell columns, and the memory cell columns on the right side of the second error correction code memory cell column are referred to as second data code memory cell columns.

In a read mode of the memory 200, each of the sensing drive circuits SD senses and reads a data byte from a designated address (designated by the address decoder ADD) of the corresponding memory cell column MCC and splits the data byte into a first partial read bit and a second partial read bit. For convenience of description, the first partial read bit and the second partial read bit are also referred to as DB1 and DB2, respectively. Next, the sensing drive circuit SD sends the first partial read bit DB1 and the second partial read bit DB2 respectively to the first error correction circuit ECC1 and the second error correction circuit ECC2 for error correction. With reference to FIG. 2, a plurality of first partial read bits DB1 are combined into first partial read data (including the first error correction code) and are received by the first error correction circuit ECC1; similarly, a plurality of second partial read bits DB2 are combined into second partial read data (including the second error correction code) and are received by the second error correction circuit ECC2.

For convenience of description, the first partial read data and the second partial read data are also referred to as ECCD1 and ECCD2, respectively. Next, in accordance with the first error correction code in the first partial read data ECCD1, the first error correction circuit ECC1 performs error correction on the first partial read data ECCD1 and generates the first partial data D1. Similarly, in accordance with the second error correction code in the second partial read data ECCD2, the second error correction circuit ECC2 performs error correction on the second partial read data ECCD2 and generates the second partial data D2. Finally, the first partial data D1 and the second partial data D2 are combined and output as the data D. In the present embodiment, the plurality of first partial read bits DB1 and the plurality of second partial read bits DB2 are both of 4 bits, the first partial read data ECCD1 and the second partial read data ECCD2 are both of 136 bits, the first error correction code and the second error correction code may both be of 8 bits, and the data D is of 256 bits.

The details of how each sensing drive circuit SD writes a data byte to a designated address of a corresponding memory cell column MCC and reads the data byte from the designated address of the corresponding memory cell column MCC will be explained below with reference to FIG. 3. Each memory cell block MC includes a plurality of first memory cells M1, a plurality of second memory cells M2, a sub-word line driver SWD, a first bit line sensor BLSA1, a second bit line sensor BLSA2, a plurality of first selective switches SW1 and a plurality of second selective switches SW2. In FIG. 2, only bit line sensors BLSA are shown to indicate the first bit line sensor BLSA1 and the second bit line sensor BLSA2 collectively. In FIG. 3, each of the first memory cells M1 and each of the second memory cells M2 include a transistor T and a capacitor C, wherein the capacitor C is coupled between the transistor T and a reference potential terminal. A control terminal of the transistor T is coupled to the sub-word line driver SWD through a word line WL and is controlled by the sub-word line driver SWD. The transistor T is connected in series between the capacitor C and a corresponding bit line. The transistor T (the transistor in the first memory cell M1) is coupled to the first bit line sensor BLSA1, or the transistor T (the transistor in the second memory cell M2) is coupled to the second bit line sensor BLSA2. The first bit line sensor BLSA1 senses stored data in the first memory cell M1 through a first bit line BL1, and the second bit line sensor BLSA2 senses stored data in the second memory cell M2 through a second bit line BL2. The first bit line sensor BLSA1 is coupled to a main input/output line MIO through a row switch RSW. Similarly, the second bit line sensor BLSA2 is coupled to the main input/output line MIO through the row switch RSW. For convenience of description, a bit line BL connected to the first memory cell M1 is referred to as the first bit line BL1 and a bit line BL connected to the second memory cell M2 as the second bit line BL2. In the present embodiment, the transistor T may be a metal-oxide-semiconductor field-effect transistor (MOSFET), and the memory cells M located in the same memory cell row MCR may be controlled by the same word line WL.

With reference to FIG. 2 and FIG. 3 together, in a write mode of the memory 200, if a write address designated by the address decoder ADD corresponds to the memory cell block (referred to as MC(11)) in the first row of the memory cell column MCC(1), a sensing drive circuit SD(1) turns on the transistors T of all the memory cells M of the memory cell blocks MC(11) through the sub-word line driver SWD. In addition, the sensing drive circuit SD(1) controls the row switch RSW to be switched on and controls a column selective line CSL0 to send a selective signal S to switch on the first selective switches SW1 and the second selective switches SW2 of the memory cell blocks MC(11) so as to connect the main input/output line MIO to the memory cell blocks MC(11). A plurality of the first bit line sensors BLSA1 are connected to the plurality of first memory cells M1 through a plurality of the first bit lines BL1, and a plurality of the second bit line sensors BLSA2 are connected to the plurality of second memory cells M2 through a plurality of the second bit lines BL2. Then, the sensing drive circuit SD(1) writes the combined first partial write bit DB1 and second partial write bit DB2 to the memory cells M of the memory cell block MC(11) respectively by the first bit line sensor BLSA1 and the second bit line sensor BLSA2 through the main input/output line MIO.

For convenience of description, the first bit line BL1 which is coupled to the switched-on first selective switch SW1 is referred to as a first selected bit line; similarly, the second bit line BL2 which is coupled to the switched-on second selective switch SW2 is referred to as a second selected bit line.

In the read mode of the memory 200, it is assumed that a read address designated by the address decoder ADD corresponds to the memory cell block MC(11). Similarly, the sensing drive circuit SD(1) controls the row switch RSW to be switched on and controls the column selective line CSL0 to send the selective signal S to switch on the first selective switches SW1 and the second selective switches SW2 of the memory cell block MC(11) so as to connect the main input/output line MIO to the first bit line sensor BLSA1 and the second bit line sensor BLSA2 of the memory cell block MC(11). A plurality of the first bit line sensors BLSA1 are connected to the plurality of first memory cells M1 through a plurality of the first bit lines BL1, and a plurality of the second bit line sensors BLSA2 are connected to the plurality of second memory cells M2 through a plurality of the second bit lines BL2. Then, the sensing drive circuit SD(1) senses the stored data from the first memory cells M1 of the memory cell block MC(11) and transmits the stored data to the first error correction circuit ECC1 through the first bit line sensors BLSA1 and the main input/output line MIO. The sensing drive circuit SD(1) senses the stored data from the second memory cells M2 of the memory cell block MC(11) and transmits the stored data to the second error correction circuit ECC2 through the second bit line sensors BLSA2 and the main input/output line MIO. That is to say, two adjacent memory cells M in the memory cell block MC respectively correspond to the first error correction circuit ECC1 and the second error correction circuit ECC2.

When two adjacent memory cells (the first memory cell M1 and the second memory cell M2 of the memory cell block MC(11) in FIG. 3, for example) fail and cause an error in the stored data, since the two adjacent memory cells M1 and M2 are respectively coupled to the first error correction circuit ECC1 and the second error correction circuit ECC2, from the viewpoint of the first error correction circuit ECC1, only one read error exists (the data read from the first memory cell M1, for example); similarly, from the viewpoint of the second error correction circuit ECC2, only one read error exist (the data read from the second memory cell M2, for example). Therefore, the first error correction circuit ECC1 and the second error correction circuit ECC2 can perform error correction on the single-bit error. For those skilled in the art, at the same cost, the memory with an error correction circuit of the disclosure has an improved error correction effect and decreases the use of spare memory. Moreover, by arranging the first memory cell M1 and the second memory cell M2 in a staggered manner, electrical interference between them can be reduced.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

INDUSTRIAL APPLICABILITY

In the disclosure, two adjacent memory cells are respectively coupled to a first error correction circuit and a second error correction circuit. When the two adjacent memory cells fail, from the viewpoint of each of the first error correction circuit and the second error correction circuit, only a single-bit error needs to be dealt with. Therefore, at the same cost, the memory with an error correction circuit of the disclosure has an improved error correction effect and decreases the use of spare memory.

What is claimed is:

1. A memory with an error correction circuit, comprising:
   a first error correction circuit performing error correction on first partial data to generate first partial write data or first partial read data;
   a second error correction circuit performing error correction on second partial data to generate second partial write data or second partial read data;
   a plurality of memory cell columns; and
   a plurality of sensing drive circuits, wherein each of the sensing drive circuits is respectively coupled to each of the memory cell columns and each of the sensing drive circuits is coupled to the first error correction circuit and the second error correction circuit, wherein
   in a write mode, each of the sensing drive circuits respectively receive a plurality of first partial write bits of the first partial write data and respectively receive a plurality of second partial write bits of the second partial write data, and each of the sensing drive circuits combines the first partial write bits with the corresponding second partial write bits and writes them to corresponding memory cell columns; and
   in a read mode, each of the sensing drive circuits respectively sense stored data in the memory cell columns to generate a plurality of the first partial write data and a plurality of the second partial write data.

2. The memory according to claim 1, wherein the memory cell columns include a first error correction code memory cell column and a second error correction code memory cell column, the first error correction code memory cell column and the second error correction code memory cell column both store a portion of a first error correction code in the first partial write data and a portion of a second error correction code in the second partial write data, and the first error correction code memory cell column and the second error correction code memory cell column are disposed adjacent to each other, wherein the memory cell columns further include a plurality of first data code memory cell columns and a plurality of second data code memory cell columns, the first data code memory cell columns are disposed adjacent to each other and are disposed on a first side of the first error correction code memory cell column, and the second data code memory cell columns are disposed adjacent to each other and are disposed on a second side of the second error correction code memory cell column, wherein the first side and the second side are opposed to each other.

3. The memory according to claim 1, wherein each of the memory cell columns comprises a plurality of memory cell blocks coupled to each other in series and each of the memory cell blocks comprises:
- a plurality of memory cells, controlled by a word line;
- a first bit line sensor coupled to a plurality of first bit lines of a plurality of first memory cells among the memory cells;
- a plurality of first selective switches coupling a plurality of first selected bit lines among the first bit lines to the corresponding sensing drive circuit according to a selective signal; and
- a second bit line sensor coupled to a plurality of second bit lines of a plurality of second memory cells among the memory cells; and
- a plurality of second selective switches coupling a plurality of second selected bit lines among the second bit lines to the corresponding sensing drive circuit according to the selective signal, wherein the first memory cells and the second memory cells are arranged in a staggered manner.

4. The memory according to claim 3, wherein each of the memory cell blocks further comprises:
- a word line driver coupled to the word line to generate a word line signal.

5. The memory according to claim 1, wherein the first partial write data and the second partial write data have the same number of bits, and the first partial read data and the second partial read data have the same number of bits.

6. The memory according to claim 1, wherein the memory further comprises:
- an address-decoding circuit coupled to the memory cell columns and the sensing drive circuits, wherein the address-decoding circuit designates addresses of the memory cell columns corresponding to the first partial write bits and the second partial write bits in the write mode, and the address-decoding circuit designates addresses of the memory cell columns corresponding to the plurality of the first partial read data and the plurality of the second partial read data in the write mode.

7. The memory according to claim 3, wherein each of the memory cells comprises:
- a transistor coupled to the first bit line sensor; and
- a capacitor coupled between the transistor and a reference potential terminal.

8. The memory according to claim 1, wherein in the read mode, each of the sensing drive circuits senses the stored data of at least 2 bits from the corresponding memory cell columns.

9. The memory according to claim 8, wherein each of the sensing drive circuits splits the stored data of the at least 2 bits into the first partial read data of at least 1 bit and the second partial read data of at least 1 bit.

10. The memory according to claim 2, wherein each of the first error correction codes and each of the second error correction codes are both of at least 2 bits.

* * * * *